Patented Jan. 9, 1945

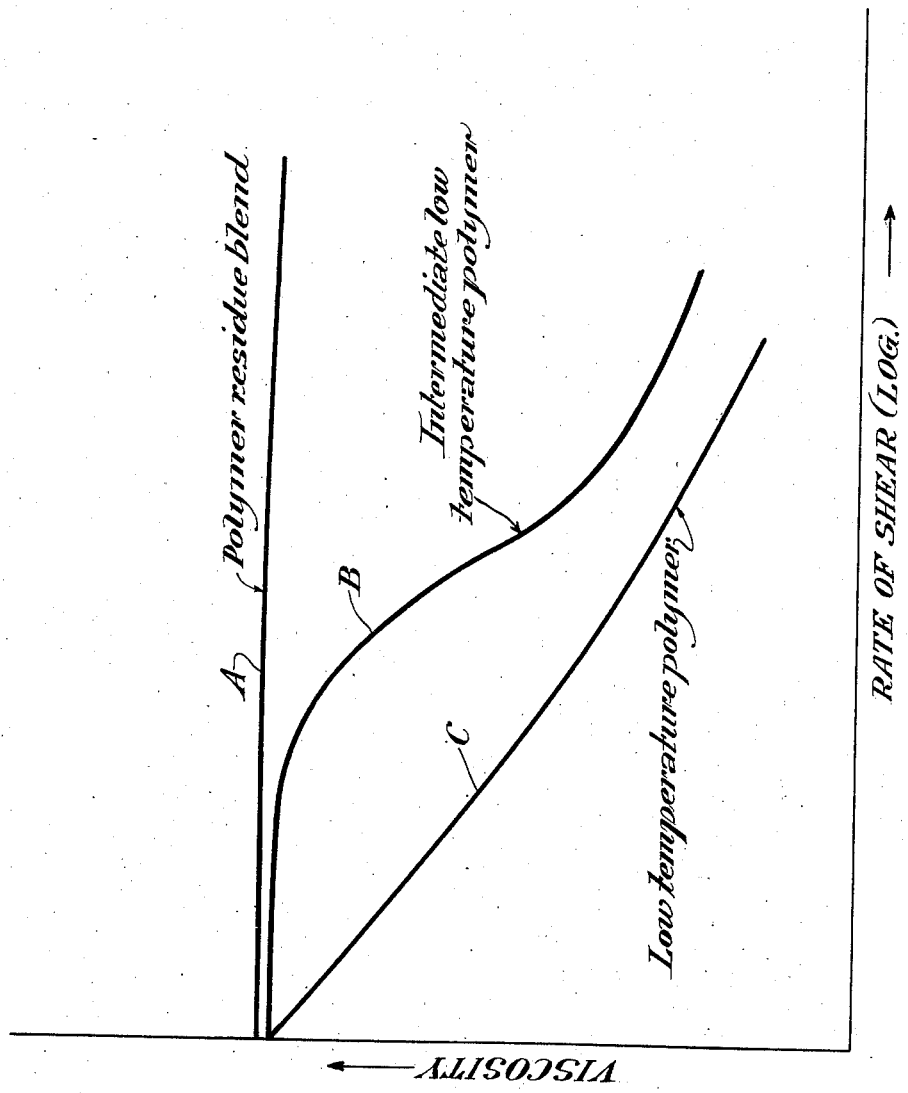

2,366,794

UNITED STATES PATENT OFFICE 2,366,794

METHOD OF MAKING SHOCK ABSORBER AND HYDRAULIC BRAKE FLUID

George G. Lamb, Chicago, Ill., assignor to Standard Oil Company, Chicago, Ill., a corporation of Indiana Application November 29, 1940, Serial No. 367,824

6 Claims. (Cl. 196—78)

This invention relates to the manufacture of oils for use in shock absorbers and hydraulic brakes. The invention relates particularly to synthetic hydrocarbon oils made by the polymerization of isobutylene and particularly blends or compounds of synthetic oils of relatively high molecular weight with other hydrocarbon oils of relatively low molecular weight. The object of the invention is to provide an oil which will satisfactorily meet the requirements of this service particularly the requirement of relatively high fluidity and relatively constant fluidity under varying conditions of temperature and rate of flow or "shear."

Heretofore, considerable difficulty has been encountered in providing a fluid for use in hydraulic brakes and shock absorbers. The primary function of the fluid in this class of equipment is to transmit force from the brake pedal to the actuating cylinder or expansion element. In the case of shock absorbers, the oil is required to transmit the force of the actuating piston to the orifices where the rebound energy is dissipated. In both cases it is important that the viscosity characteristics of the oil remain relatively constant, especially with respect to the effect of the shearing rate or rate of flow of the oil on its viscosity. A very low pour point for a given viscosity is also highly desirable and blends prepared as described herein are outstanding in this respect. For example, an oil of 186 seconds viscosity at 100° F. (Saybolt Universal) had a pour point of —50° F. and one of 1400 seconds viscosity at 100° F. (Saybolt Universal) had a pour point of —35° F. Glycerine and glycol have been used extensively for the purpose but suffer by reason of their low viscosity index, i. e., high rate of change of viscosity with temperature.

Many fluids are known, such as soap solutions, solutions of gums, resins and high molecular weight substances, in general dissolved in various solvents which exhibit the phenomenon of "false viscosity." By false viscosity is meant a different viscosity for different rates of shear. For example, when such solutions flow through an orifice or a narrow tube at a low rate, they exhibit a higher viscosity than they do when flowing at higher rates. The cause of this phenomenon is bound up with the colloidal behavoir of solutions in which the solute has a high molecular weight. Other characteristics of the solute, such as its molecular configuration are also factors about which little is understood.

It is an object of my invention to provide a shock absorber and brake fluid having the desired viscosity and a relatively high viscosity index by compounding isobutylene polymers while at the same time avoiding the false viscosity heretofore encountered in compounding such oils. In brief, I accomplish this by compounding an isobutylene polymer of critically selected molecular weight and history, produced by controlled polymerization and distillation operations. By "viscosity index" is meant the Dean and Davis Viscosity Index which is a measure of the resistance of an oil to change in viscosity with temperature. Other and more detailed objects, advantages and uses of my invention will become apparent as the description thereof proceeds.

My invention is illustrated by a drawing which shows graphically the difference in viscosity characteristics of the blends of the isobutylene polymer employed in my invention in comparison with the isobutylene polymers heretofore employed in the manufacture of lubricating oils for various purposes.

It has heretofore been the practice to polymerize liquid isobutylene with Friedel-Crafts catalysts such as aluminum chloride and boron fluoride, generally at low temperatures of the order of —10° C. and lower. The product obtained from polymerizing under these conditions has a high molecular weight, upwards of 800 to 1000 and commonly many thousands. This polymer has been used by blending with various oils to produce oils of various viscosities suitable for many uses. I have discovered, however, that the oils made with this polymer are not suitable for shock absorber and hydraulic brake fluids because of a pronounced false viscosity by which they are characterized. Thus, at rates of shear represented by 2,268 reciprocal seconds, the viscosity of a 7% blend of this polymer in S. A. E. 20W blending oils was 241.2. With a higher rate of shear, 24,500 reciprocal seconds, the viscosity fell to 220.6 at the same temperature.

I have discovered that when liquid isobutylene is polymerized at substantially higher temperatures than the temperature heretofore employed for making lubricating oil thickeners, i. e., about −10° C. and below, an oil is obtained which, when distilled, preferably under vacuum, results in a heavy polymer residue fraction which has a relatively high molecular weight and which is substantially free from false viscosity heretofore encountered with isobutylene polymers made at low temperatures. I employ temperatures above −10° C. and generally between about 0° and 75° C. for the polymerization of isobutylene, using pressure to maintain it in the liquid phase. The residue obtained in this way is an excellent fluid for use in shock absorber and hydraulic brake mechanisms, when compounded with lighter oils to adjust the viscosity. The blend with refined natural or synthetic oils possesses a relatively high viscosity index in addition to which it is substantially free from false viscosity.

The following tabulated data will show that oil prepared in this way suffers almost no loss in viscosity with an increase in rate of shear whereas oils made from low temperature isobutylene polymers suffer a very severe loss in viscosity at higher rates of shear.

*Saybolt viscosities at 100° F.*

| Oil | Rate of shear in reciprocal seconds | | | | | | |
|---|---|---|---|---|---|---|---|
| | 680 | 2,268 | 3,670 | 7,348 | 12,235 | 24,500 | 39,640 |
| New shock absorber oil. 60% polymer residue. 40% S. A. E. 10W blend oil. | 287.7 | 286.2 | 287.1 | 287.4 | 288.3 | 287.6 | 285.6 |
| Comparison oil—I. 7% low temperature Isobutylene resin—I. 93% S. A. E. 20W blend oil. | 241.0 | 241.2 | 243.1 | 239.1 | 231.6 | 220.6 | 217.6 |
| Comparison oil—II. 15% low temperature Isobutylene resin—II. 85% S. A. E. 10W blend oil. | 448 | 435 | 430 | 424 | 419 | 413 | 409 |

It will be seen from these data that the oil made from isobutylene polymer residue according to this invention possesses a viscosity which is practically independent of the rate of shear of the oil, as a result of which this compounded oil gives superior performance in shock absorbers and hydraulic brakes in which the operating fluid is subjected to high and widely variable rates of shear.

Referring to the drawing, the lines A, B and C are graphical representations of the relation between viscosity and rate of shear, the rate of shear being plotted logarithmically. The data for the graph were obtained from blends of different isobutylene polymers with a light lubricating oil of S. A. E. 20W viscosity. The concentration of the polymer in the oils is adjusted to give all three blends the same viscosity at low rates of shear. Curve A represents the data obtained with the polymer residue prepared by polymerization of isobutylene with boron fluoride at 5° C., followed by distillation to a heavy residue. The blended oil was completely soluble in a mixture of equal volumes of acetone and benzol. The curve B represents the data obtained from a polymer made at −40° C. whereas the data for curve C were obtained from a polymer produced at −80° C. The polymers employed in the blends corresponding to B and C were almost completely precipitated by a mixture of equal volumes of acetone and benzol.

It will be observed from the graph that as the rate of shear increases, the viscosity falls off in the case of the low temperature polymers.

The following is a detailed description of the method of making my isobutylene polymer residue for use in compounding hydraulic brake and shock absorber fluids. If pure isobutylene is available, I prefer to dilute it to about 20 to 25% concentration with an inert diluent such as butane or naphtha. In general, however, I prefer to employ the C₄ fraction separated from cracking still gases. This fraction is made up substantially entirely of butanes and butylenes and ordinarily contains about 12 to 18% of isobutylene. By refractionation the isobutylene content may be increased readily to between 20 and 30%, if desired.

Beginning with the $C_4$ fraction from cracking still gases, I bring about the polymerization of the isobutylene contained therein by treatment with a suitable catalyst, preferably $BF_3$. The amount of catalyst required is usually in the range of .03 to 0.5% or even less, based on the total weight of the $C_4$ fraction treated. Before adding the catalyst the temperature is adjusted to the desired point, usually about 0 to 30° C. Means are provided during the reaction to control the temperature by rapid cooling and agitation of the reaction mixture. It is preferred to carry out the reaction in a closed container or a continuous coil under moderate pressure to prevent the escape of hydrocarbon gases. However, if desired, I may conduct the reaction at atmospheric pressure in a vessel from which the gases evolved during the reaction are withdrawn and recovered. By this means the temperature of the reaction may be controlled, the refrigerating effect of the evaporating gases serving to absorb the heat of the reaction. By controlling the pressure on the evaporating gases, any desired temperature may be maintained during the reaction from the boiling point of isobutylene upward.

After the reaction is completed which requires only a short time, the product is washed with an alkaline solution to neutralize and remove the catalyst. The unreacted portion of the $C_4$ fraction is removed by distillation.

The product is an oil of medium viscosity and relatively wide boiling range. It is subjected to distillation, preferably by using a pipe heater in which the polymer product is heated to a fairly high temperature of the order of 500 to 600° F. and discharged into an evaporating chamber from which the vaporized fractions are withdrawn continuously and subsequently condensed. The unvaporized or bottoms portion of the polymer is withdrawn as a liquid and forms the base stock from which my shock absorber and brake fluids are compounded. Typical fractions had the following characteristic viscosity and molecular weight:

| | Saybolt Universal viscosity at 210° F. | Molecular weight |
|---|---|---|
| Sample I | 1,644 | 1,090 |
| Sample II | 3,080 | 1,260 |

For comparison, a quantity of isobutylene polymer was prepared by polymerizing the $C_4$ fraction of cracking still gases, at a low temperature of about −80° C. Three shock absorber oils were prepared by compounding this resin and the two polymer residues above referred to with a light machine oil having a flashpoint of 335° F. and pour point of —20° F. The viscosity of each blend was practically the same.

| Polymer used | Amount of polymer in blend | Saybolt viscosity of blends at— | | V. I. | A. P. I. gravity | Acetone-benzene insoluble |
|---|---|---|---|---|---|---|
| | | 100° F. | 210° F. | | | |
| | Per cent | | | | Degrees | Per cent |
| Polymer residue—Sample I | 46 | 1,412 | 103 | 90 | 26 | 0 |
| Polymer residue—Sample II | 41 | 1,400 | 100 | 86 | 25 | 0 |
| Low temperature isobutylene resin | 21.5 | 1,400 | 143 | 123 | 25 | 25 |
| Light oil blending base | 0 | 107 | 39 | 55 | 24.9 | 0 |

It will be noted from the foregoing data that there is a striking difference between the effects of the polymer residue and the isobutylene resin on the viscosity index of the light machine oil. The low temperature resin, employed in only about half the amount, gives the same viscosity in the blend at 100° F. and a much higher viscosity at 210° F., corresponding to an increase in the viscosity index from about 55 to 123. Another striking difference between these polymers is the solubility or insolubility in a 50–50 mixture of acetone and benzene. I have discovered that when one volume of the blended oil is added to one volume each of benzene and acetone, there is substantially no separation of resin from the shock absorber oil compounded with isobutylene polymer residue, certainly not more than 1–2%, whereas in the case of the isobutylene polymer blend made according to the methods of the prior art substantially all of the resin is precipitated as a separate plastic phase.

The reason for this difference in these oils is not understood. It can not be explained satisfactorily by a difference in molecular weight because tests have shown that the molecular weights of the polymers may be very nearly the same. As a further example of this effect, I have prepared an isobutylene polymer at —60° F. and made careful molecular weight determinations on the product. Following is a description of the method and results obtained:

To 400 grams of the liquid isobutylene fraction from cracking still gases cooled to —60° F. there was added 135 ml. of BF₃ gas. A rapid polymerization occurred with a rise in temperature to —16° F. Vigorous cooling brought the temperature back to —60° F. at the end of the reaction. Unreacted C₄ hydrocarbons were evaporated from the product which was then dissolved in hexane, neutralized and washed with water. The hexane along with light polymer fractions was removed at 300° F. in a stream of nitrogen. The yield of polymer was 14% by weight and the molecular weight was determined to be 1210 by the boiling point method.

A blend of this polymer with 64% of low cold test machine oil had a viscosity of 1399 seconds Saybolt at 100° F. It was tested with benzene-acetone by first dissolving in 15 ml. benzene and then adding 15 ml. of acetone. The heavy layer which formed at room temperature was allowed to settle and was removed. The solvent was evaporated from the heavy layer leaving a heavy, sticky, viscous hydrocarbon weighing 4.7 grams, equal to 97% of the resin originally present in the blend. This polymer was compared with the isobutylene polymer residue prepared by the method described hereinabove, the residue having a molecular weight of 1260, determined by the boiling point method.

A shock absorber oil made by blending this polymer residue with low cold test machine oil had a viscosity of 1400 Saybolt at 100° F. When tested with benzene-acetone in the manner just described, no separation whatever occurred.

In the manufacture of my shock absorber and brake fluids from isobutylene polymers, it is desirable to carry the distillation of the polymer to a point where the polymer residue remaining unvaporized will have a molecular weight of at least 700 and preferably in the range of 1000 to 1500. The corresponding Saybolt viscosities at 210° F. are about 300, 1000 and 5000 respectively. Residues having somewhat higher average molecular weights, up to 2,000, for example, may be employed. Some decomposition and deep-seated rearrangement of the polymer appears to occur during distillation and I prefer to employ a vacuum during the distillation to avoid excessive decomposition.

The amount of polymer employed in blends will ordinarily be about 25 to 75%, depending on the specifications of the particular oil being manufactured and depending also on the viscosity of the blending oil. Blends of 35 to 50% polymer residue are frequently employed in shock absorbers while blends of lower concentration are commonly used as brake fluids. For compounding my shock absorber and brake fluids, I prefer to employ refined mineral oils having a rather low viscosity, generally within the range of 80 to 200 seconds Saybolt at 100° F. Somewhat heavier oils may be employed, however, with viscosities of 300 to 400 seconds Saybolt at 100° F. I may also employ light fractions in this viscosity range from the isobutylene polymer itself, taken off in making the polymer residue.

Having thus described my invention, what I claim is:

1. The method of making shock absorber and hydraulic brake fluids characterized by a viscosity substantially independent of rate of shear and particularly adapted for use in hydraulic equipment wherein the oil transmits energy from one part to another while flowing thru restricted passages and wherein it is desirable that the flow characteristics of the oil remain constant regardless of the rate of flow, said method comprising blending with a light refined lubricating oil having a viscosity in the range of 80 to 400 seconds Saybolt at 100° F., about 25 to 75% of a heavy isobutylene polymer residue having a molecular weight between about 700 and 2000, said polymer residue having been produced by polymerizing liquid isobutylene with a Friedel-Crafts catalyst at a temperature above —10° C. thereby producing a hydrocarbon polymer product having a wide range of molecular weights and distilling the said polymer to remove low molecular weight hydrocarbons and give the desired heavy residue which is blended with said light lubricating oil.

2. The method of claim 1 wherein said polymer residue is blended with a light refined machine oil having a viscosity within the range of 80 to 200 seconds Saybolt at 100° F.

3. The method of claim 1 wherein the temperature of the reaction in the presence of said Friedel-Crafts catalyst is above 0° C.

4. The method of making a fluid for hydraulic shock absorbers and brakes which is substantially free of false viscosity and particularly adapted for use in hydraulic equipment wherein it is desirable that the flow characteristics of the oil remain constant regardless of the rate of flow, comprising polymerizing liquid isobutylene at temperatures above −10° C. with a Friedel-Crafts catalyst, separating the polymerization product by distillation into distillate oil fractions and a polymer residue fraction having a molecular weight between about 700 and 2000 and compounding said polymer residue fraction with about 25 to 75% of a light lubricating oil having a viscosity within the range of about 80 to 400 seconds Saybolt at 100° F.

5. The method of claim 4 wherein the light lubricating oil employed is a distillate fraction obtained in the distillation of said polymer, said distillate fraction having a viscosity in the range of 80 to 200 seconds Saybolt at 100° F.

6. The method of claim 4 wherein the Friedel-Crafts catalyst employed is boron fluoride.

GEORGE G. LAMB.